(12) United States Patent
Pfeffer et al.

(10) Patent No.: US 6,529,728 B1
(45) Date of Patent: Mar. 4, 2003

(54) METHOD AND APPARATUS IN A WIRELESS COMMUNICATION SYSTEM FOR SELECTIVELY PROVIDING INFORMATION SPECIFIC TO A LOCATION

(75) Inventors: Darrell Anthony Pfeffer, Delray, FL (US); Craig Stuart Wallace, Boynton Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/502,066

(22) Filed: Feb. 10, 2000

(51) Int. Cl.[7] .............................. H04M 3/00; H04Q 7/20
(52) U.S. Cl. ........................ 455/418; 455/456; 455/435
(58) Field of Search ................................ 455/418, 419, 455/414, 3.05, 456, 41, 517, 435, 432, 550; 370/908; 340/825.26, 825.27, 7.48, 905

(56) References Cited

U.S. PATENT DOCUMENTS

| 5,559,520 A | 9/1996 | Barzegar et al. ............ 342/357 |
| 6,014,060 A * | 1/2000 | Rosen et al. ................. 340/905 |
| 6,091,956 A * | 7/2000 | Hollenberg .................. 455/456 |
| 6,196,894 B1 * | 1/2001 | McCormick et al. ........ 455/414 |

* cited by examiner

Primary Examiner—Edward F. Urban
Assistant Examiner—Erika A. Gary
(74) Attorney, Agent, or Firm—R. Louis Breeden; Hisashi D. Watanabe

(57) ABSTRACT

A portable communication unit (PCU) (102) performs (402) a registration process with a wireless local area network (WLAN) (104) when the PCU moves within communication range of the WLAN. The PCU and the LAN cooperate to create (404) a local information profile describing at least one of types of information and methods of delivering the information desired by a user of the PCU. During the registration process, the PCU and the WLAN cooperate further to determine (406) whether a type of information described in the local information profile is out-of-date or missing in the PCU. If so, the WLAN downloads (408) the type of information to the PCU in accordance with the local information profile.

21 Claims, 4 Drawing Sheets

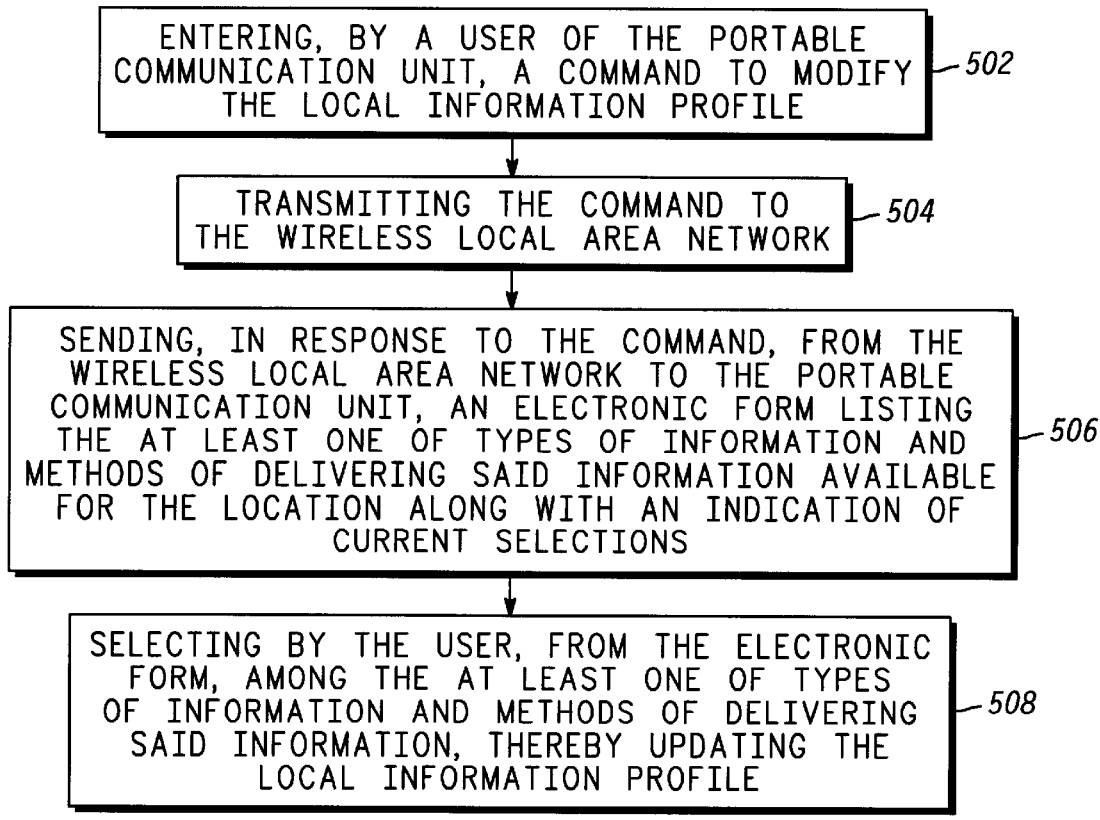

US 6,529,728 B1

METHOD AND APPARATUS IN A WIRELESS COMMUNICATION SYSTEM FOR SELECTIVELY PROVIDING INFORMATION SPECIFIC TO A LOCATION

FIELD OF THE INVENTION

This invention relates in general to wireless communication systems, and more specifically to a method and apparatus for selectively providing information specific to a location.

BACKGROUND OF THE INVENTION

Users of wireless devices may travel from one wireless communication system to another. This will happen with increasing frequency as short-range wireless communication systems emerge for providing higher data rates than possible on today's wide area wireless systems.

As a user enters a new location there may be local information that would be of value to the user. The local information can include, for example, location maps, local schedules and meetings, local phone numbers, local email addresses, and important local broadcast messages. The issue is getting the local information to the user automatically, using minimum system overhead and transmission time.

Thus, what is needed is a method and apparatus for selectively providing information specific to a location, the information provided to a portable communication unit when the portable communication unit registers with a wireless local area network serving the location. Preferably, the information will be provided automatically with minimum possible use of air time, and the user will be able to control the types of information provided.

SUMMARY OF THE INVENTION

An aspect of the present invention is a method for selectively providing information specific to a location, the information provided to a portable communication unit when the portable communication unit registers with a wireless local area network serving the location. The method comprises the steps of performing a registration process between the portable communication unit and the wireless local area network when the portable communication unit moves within communication range of the wireless local area network, and creating a local information profile describing at least one of types of information and methods of delivering the information desired by a user of the portable communication unit. The method further comprises the steps of determining, during the registration process, whether a type of information described in the local information profile is out-of-date or missing in the portable communication unit; and downloading the type of information to the portable communication unit in accordance with the local information profile, only when the type of information is out-of-date or missing in the portable communication unit.

Another aspect of the present invention is a portable communication unit for selectively providing information specific to a location, the information provided to the portable communication unit when the portable communication unit registers with a wireless local area network serving the location. The portable communication unit comprises a transceiver for communicating with the wireless local area network, and a processor coupled to the transceiver for controlling the portable communication unit. The portable communication unit further comprises a memory coupled to the processor for storing software and other data, and a user interface coupled to the processor for conveying the information to a user. The processor is programmed to cooperate with the wireless local area network to perform a registration process between the portable communication unit and the wireless local area network when the portable communication unit moves within communication range of the wireless local area network, and to create a local information profile describing at least one of types of information and methods of delivering the information desired by the user. The processor is further programmed to determine, during the registration process, whether a type of information described in the local information profile is out-of-date or missing in the portable communication unit; and to download the type of information to the portable communication unit in accordance with the local information profile, only when the type of information is out-of-date or missing in the portable communication unit.

Another aspect of the present invention is a wireless local area network for selectively providing information specific to a location, the information provided to a portable communication unit when the portable communication unit registers with the wireless local area network. The wireless local area network comprises a transceiver for communicating with the portable communication unit, and a processor coupled to the transceiver for controlling the transceiver. The wireless local area network further comprises a memory element coupled to the processor for storing the information, and an input interface coupled to the processor for receiving the information. The processor is programmed to perform a registration process between the portable communication unit and the wireless local area network when the portable communication unit moves within communication range of the wireless local area network, and to cooperate with the portable communication unit to create a local information profile describing at least one of types of information and methods of delivering the information desired by a user of the portable communication unit. The processor is further programmed to determine, during the registration process, whether a type of information described in the local information profile is out-of-date or missing in the portable communication unit; and to download the type of information to the portable communication unit in accordance with the local information profile, only when the type of information is out-of-date or missing in the portable communication unit.

BRIEF DESCRIPTION OF THE DRAWINGS

FIG. 5 is a flow diagram depicting a second operation of the wireless communication system in accordance with the present invention.

FIG. 6 is an exemplary electronic form in accordance with the present invention.

DETAILED DESCRIPTION OF THE DRAWINGS

Figure 1:
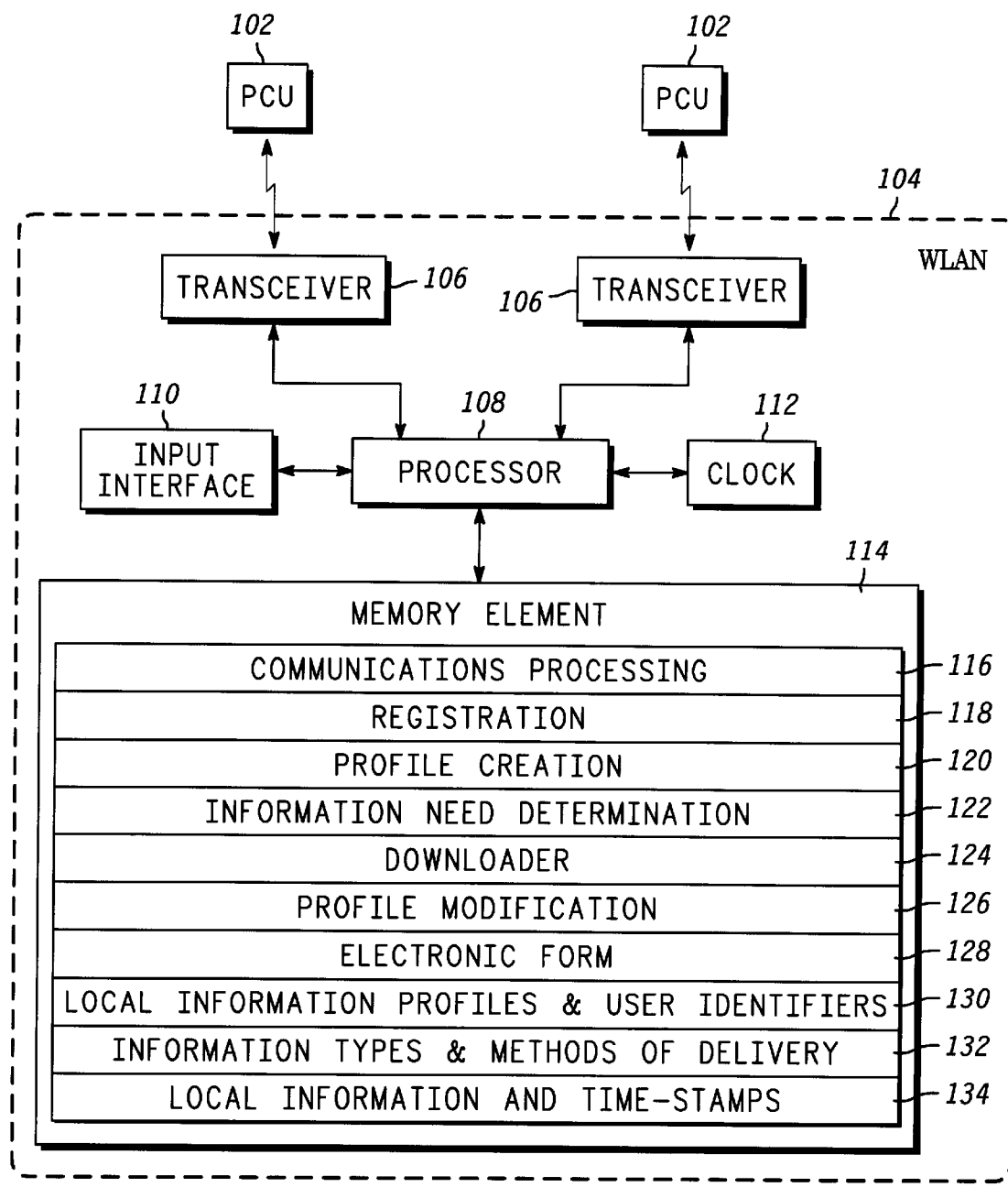
FIG. 1 is an electrical block diagram of an exemplary wireless communication system in accordance with the present invention.

FIG. 1 is an electrical block diagram of an exemplary wireless communication system 100 in accordance with the present invention. The communication system 100 preferably comprises a wireless local area network (WLAN) 104 and at least one portable communication unit 102, which can communicate with the WLAN 104. The WLAN 104 comprises at least one conventional transceiver 106 for communicating with the portable communication unit 102, and a conventional processor 108 coupled to the at least one transceiver 106 for controlling the same. The WLAN also includes a conventional input interface 110 coupled to the processor 108 for inputting information into the WLAN from an information source, such as a database server or another network. In addition, the WLAN 104 includes a clock 112 coupled to the processor 108 for time-stamping the information whenever the information is updated.

The processor 108 also is preferably coupled to a memory element 114, e.g., a conventional magnetic disk drive, for storing information and operating software in accordance with the present invention. The memory element 114 comprises a conventional communications processing program 116 for programming the processor 108 to handle the communications of the WLAN 104 through well-known techniques. The memory element 114 further comprises a registration program 118 for performing a registration process with the portable communication unit 102 when the portable communication unit 102 moves within communication range of the WLAN 104. The memory element 114 also includes a profile creation program 120 for programming the processor 108 to cooperate with the portable communication unit 102 to create a local information profile describing at least one of types of information and methods of delivering the information desired by a user of the portable communication unit 102. In addition, the memory element 114 includes an information need determination program 122 for programming the processor 108 to determine, during the registration process, whether a type of information described in the local information profile is out-of-date or missing in the portable communication unit 102.

The memory element 114 further comprises a downloader program 124 for programming the processor 108 to download the type of information to the portable communication unit in accordance with the local information profile, only when the type of information is out-of-date or missing in the portable communication unit 102. The memory element 114 also includes a profile modification program 126 for programming the processor 108 to cooperate with the transceiver 106 to receive a command from the portable communication unit 102 to modify the local information profile; and to cooperate further with the transceiver 106 to send, to the portable communication unit 102 in response to the command, an electronic form 128 listing the at least one of types of information and methods of delivering the information available for the location along with an indication of current selections.

In addition, the memory element 114 includes space for storing the electronic form 128, local information profiles and corresponding user identifiers 130, information types and methods of delivery 132 available from the WLAN 104, and the local information and corresponding time-stamps 134 for each type of local information available from the WLAN 104. Operation of the wireless communication system 100 in accordance with the present invention is described further herein below.

Figure 2:
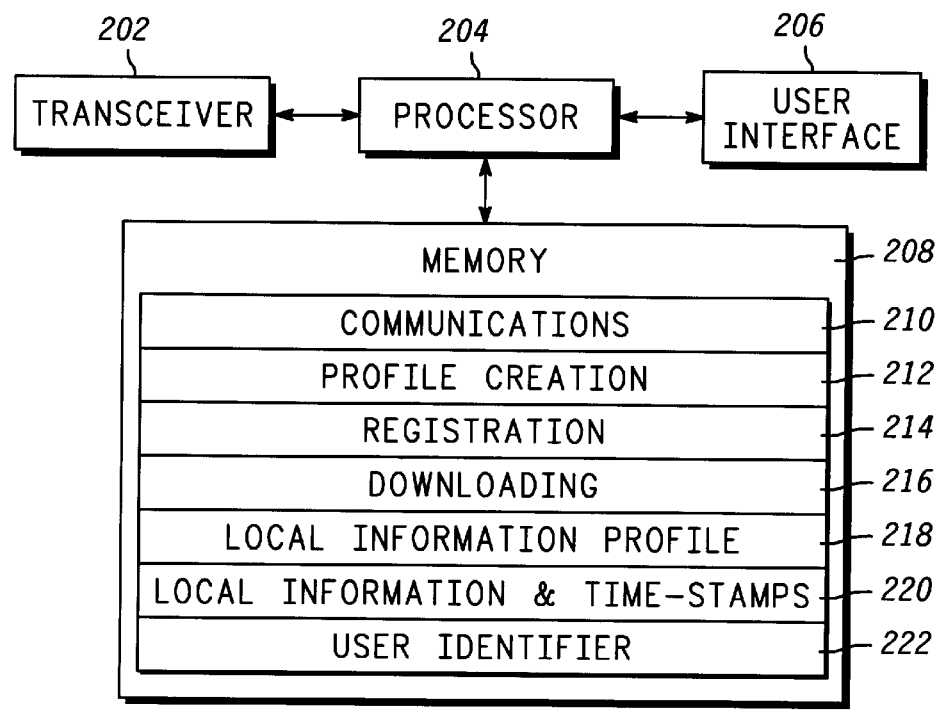
FIG. 2 is an electrical block diagram of an exemplary portable communication unit in accordance with the present invention.

FIG. 2 is an electrical block diagram of the portable communication unit 102 in accordance with the present invention, comprising a conventional transceiver 202 for communicating with the wireless local area network 104, and a conventional processor 204 coupled to the transceiver 202 for controlling the portable communication unit 102. The portable communication unit 102 further comprises a conventional user interface 206 coupled to the processor 204 for conveying information to a user. The portable communication unit 102 also includes a conventional memory 208 coupled to the processor 204 for storing software and other data.

The memory 208 comprises a conventional communications program 210 for programming the processor 204 to cooperate with the transceiver 202 to communicate with the WLAN 104. The memory 208 further comprises a profile creation program 212 for programming the processor 204 to cooperate with the WLAN 104 to create a local information profile describing at least one of types of information and methods of delivering the information desired by the user. The memory also includes a registration program 214 for programming the processor 204 to perform a registration process between the portable communication unit 102 and the WLAN 104 when the portable communication unit 102 moves within communication range of the WLAN 104, and to cooperate with the WLAN 104 to determine, during the registration process, whether a type of information described in the local information profile is out-of-date or missing in the portable communication unit 102. In addition, the memory 208 includes a downloading program 216 for programming the processor 204 to cooperate with the WLAN 104 to download the type of information from the WLAN 104 to the portable communication unit 102 in accordance with the local information profile, only when the type of information is out-of-date or missing in the portable communication unit 102. The memory 208 further comprises space for storing a local information profile 218, local information and corresponding time-stamps 220 for each type of information stored, and a user identifier 222. Operation of the portable communication unit 102 in accordance with the present invention is described further herein below.

Figure 3:
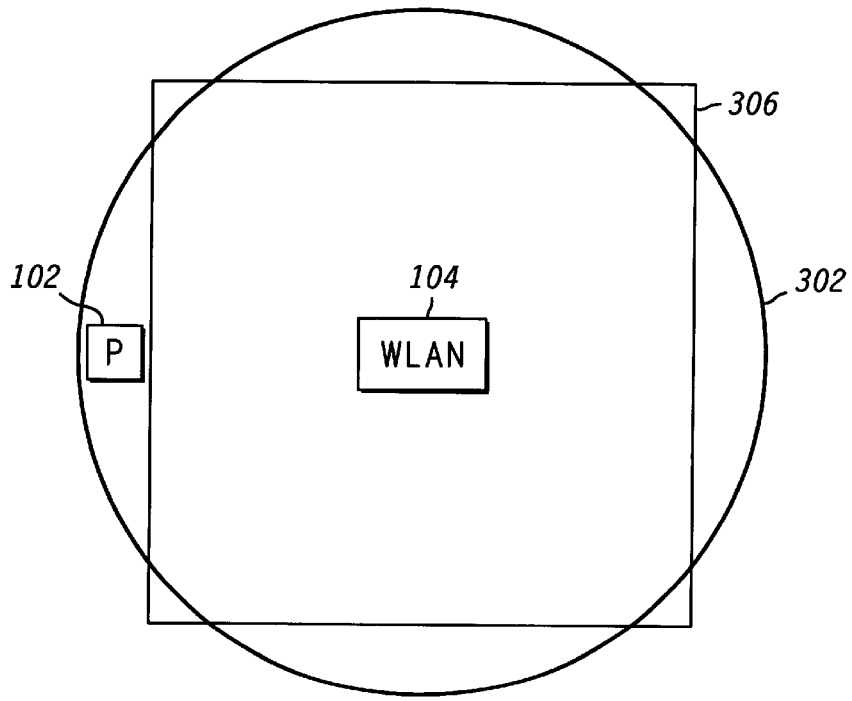
FIG. 3 is a plan diagram depicting a coverage area of the exemplary wireless communication system in accordance with the present invention.

FIG. 3 is a plan diagram 300 depicting a coverage area 302 of the exemplary wireless communication system 100 in accordance with the present invention. Preferably, the coverage area 302 roughly coincides with the perimeter 306 of a physical structure, e.g., a building, served by the WLAN 104, so that when the portable communication unit 102 approaches the building, the portable communication unit 102 can register with the WLAN 104.

Figure 4:
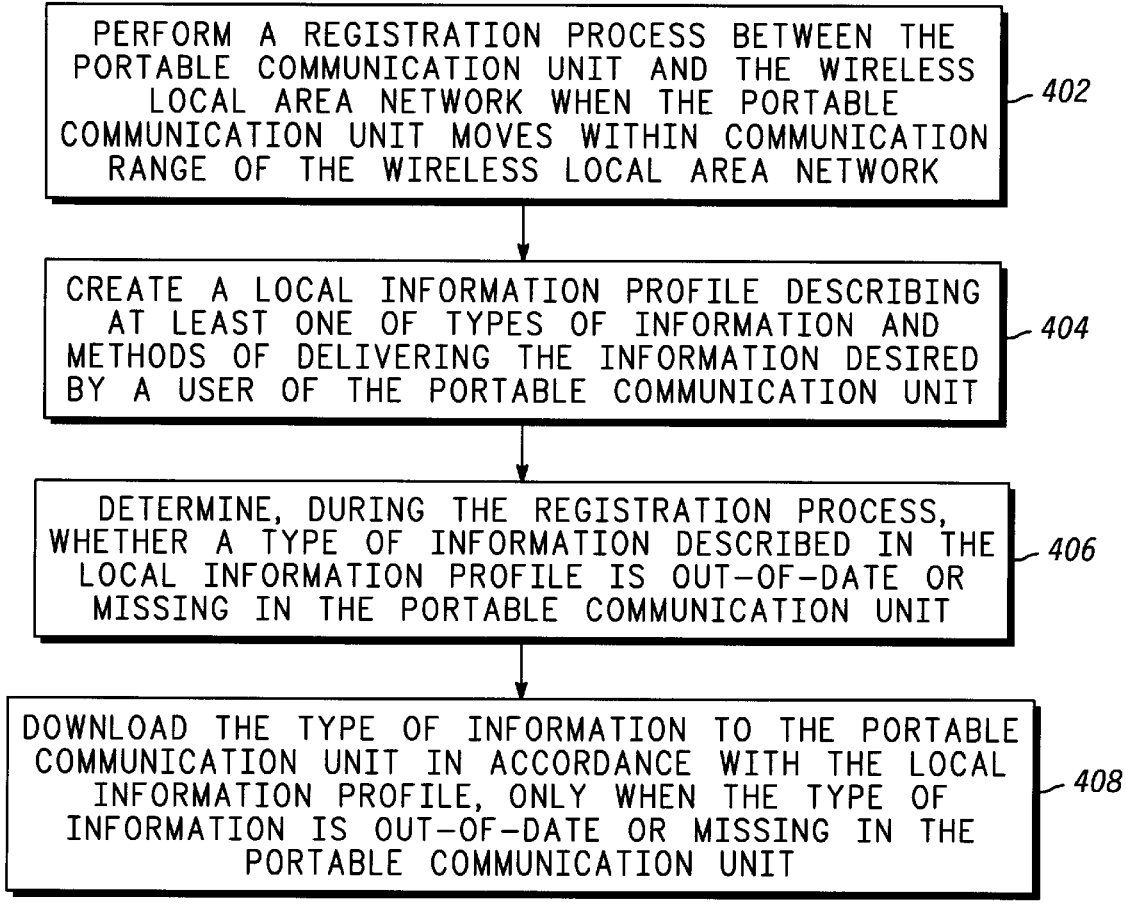
FIG. 4 is a flow diagram depicting a first operation of the wireless communication system in accordance with the present invention.

FIG. 4 is a flow diagram 400 depicting a first operation of the wireless communication system 100 in accordance with the present invention. The flow begins with the portable communication unit 102 and the WLAN 104 cooperating to perform 402 a registration process between the portable communication unit 102 and the WLAN 104 when the portable communication unit 102 moves within communication range of the WLAN 104. As part of the registration process, the portable communication unit 102 sends the user identifier 222 to the WLAN 104. If necessary, the portable communication unit 102 and the WLAN 104 cooperate to create 404 a local information profile describing at least one of types of information and methods of delivering the information desired by the user of the portable communication unit 102. Advantageously, this step is not necessary when the WLAN 104 has a copy of the local information profile corresponding to the user identifier 222 created during a previous registration and stored in the memory element 114. Next, the portable communication unit 102 and the WLAN 104 cooperate further to determine 406, during the registration process, whether a type of information described in the local information profile is out-of-date or missing in the portable communication unit 102, and to download 408 the type of information to the portable communication unit in accordance with the local information profile, only when the type of information is out-of-date or missing in the portable communication unit 102.

Sometimes when performing the registration process, the WLAN 104 discovers that the WLAN 104 does not have a copy of the local information profile for the user. In response, the WLAN 104 requests the portable communication unit 102 to send the local information profile 218 to the WLAN 104. Then, the portable communication unit 102 responds by transmitting the local information profile 218 and the user identifier 222 to the WLAN 104. It will be appreciated that the local information profile 218 resident in the portable communication unit 102 is a generic profile which defines standard categories of information available in every WLAN 104. If the user wishes to obtain a non-standard category of information, additional communications with the WLAN 104 will be needed as explained herein below.

At other times when performing the registration process, the WLAN 104 can discover that neither the WLAN 104 nor the portable communication unit 102 has a copy of the local information profile for the user. In this case, the WLAN 104 sends the portable communication unit 102 an electronic form preferably listing the types of information and methods of delivering the information available for the location. The user then selects, from the electronic form, among the types of information and methods of delivering the information, thereby creating the local information profile, which is then sent along with the user identifier to the WLAN 104 for storage therein.

At still other times when performing the registration process, the WLAN 104 can discover that the local information profile 218 in the portable communication unit 102 is indefinite about how certain types of information available from the WLAN 104 are to be handled. In response, the WLAN 104 sends the portable communication unit 102 an electronic form listing the types of information and methods of delivering the information available for the location. The user then selects from the electronic form, among the types of information and methods of delivering the information, thereby updating the local information profile, which is then sent along with the user identifier to the WLAN 104 for storage therein.

In order to keep track of whether the information downloaded earlier to the portable communication unit 102 is still current, the WLAN 104 sends a first time-stamp to the portable communication unit 102 when downloading the information to the portable communication unit 102. In addition, the WLAN 104 stores in the memory element 114 a second time-stamp for each information type stored therein whenever the information corresponding to the information type is changed. As part of the registration process, the portable communication unit 102 sends the WLAN 104 the first time-stamps corresponding to each information type that has been downloaded to the portable communication unit 102. The WLAN 104 then compares the first and second time-stamps for each information type to determine whether the information is out-of-date. If so, the WLAN 104 then downloads the current information corresponding to the information type to the portable communication unit 102 to update the information in the portable communication unit 102.

FIG. 5 is a flow diagram 500 depicting a second operation of the wireless communication system in accordance with the present invention. The flow begins when the user of the portable communication unit 102 enters 502 a command to modify the local information profile. The portable communication unit 102, in response, transmits 504 the command to the WLAN 104. In response to the command, the WLAN 104 sends 506 an electronic form to the portable communication unit 102 listing the types of information and methods of delivering the information available for the location, along with an indication of current selections. The user then selects 508, from the electronic form, among the types of information and methods of delivering the information, thereby updating the local information profile. The portable communication unit 102 then preferably returns the updated local information profile to the WLAN 104 for storage therein.

FIG. 6 is an exemplary electronic form 600 in accordance with the present invention. The electronic form 600 is displayed on a display of the portable communication unit 102 and depicts the user's local information profile as it would appear after the user has made some selections through the user interface 206 concerning the types of information and the methods of delivery desired by the user. In this particular example, the user has selected brief email delivery, a brief service directory, no facility map, and a detailed phone directory. If the user later decides to modify the local information profile, the electronic form 600 advantageously can be returned to the portable communication unit 102 for modification by the user, as described above.

It should be clear from the preceding disclosure that the present invention provides a method and apparatus for selectively providing information specific to a location, the information provided to a portable communication unit when the portable communication unit registers with a wireless local area network serving the location. Advantageously, the information is provided automatically with minimum possible use of air time, and the user is able to control the types of information provided.

Many modifications and variations of the present invention are possible in light of the above teachings. Thus, it is to be understood that, within the scope of the appended claims, the invention can be practiced other than as specifically described herein above.

What is claimed is:

1. A method for selectively providing information specific to a location, the information provided to a portable communication unit when the portable communication unit registers with a wireless local area network serving the location, the method comprising the steps of:

performing a registration process between the portable communication unit and the wireless local area network when the portable communication unit moves within communication range of the wireless local area network;

creating a local information profile describing at least one of types of information and methods of delivering said information desired by a user of the portable communication unit;

determining, during the registration process, whether a type of information described in the local information profile is out-of-date or missing in the portable communication unit; and downloading said type of information to the portable communication unit in accordance with the local information profile, only when said type of information is out-of-date or missing in the portable communication unit.

2. The method of claim 1, wherein the registration process comprises the steps of:

discovering, by the wireless local area network, that the wireless local area network does not have a copy of the local information profile for the user;

requesting, by the wireless local area network, the portable communication unit to send the local information profile to the wireless local area network; and transmitting, by the portable communication unit in response to the requesting step, the local information profile and a user identifier to the wireless local area network.

3. The method of claim 1, wherein the creating step comprises the steps of:
  discovering by the wireless local area network that neither the wireless local area network nor the portable communication unit has a copy of the local information profile for the user;
  sending from the wireless local area network to the portable communication unit an electronic form listing the at least one of types of information and methods of delivering said information available for the location; and
  selecting by the user, from the electronic form, among the at least one of types of information and methods of delivering said information, thereby creating the local information profile.

4. The method of claim 1, further comprising the steps of:
  discovering by the wireless local area network that the local information profile in the portable communication unit is indefinite about how certain types of information available from the wireless local area network are to be handled;
  sending from the wireless local area network to the portable communication unit an electronic form listing the at least one of types of information and methods of delivering said information available for the location; and
  selecting by the user, from the electronic form, among the at least one of types of information and methods of delivering said information, thereby updating the local information profile.

5. The method of claim 1, further comprising the step of storing the local information profile and a user identifier in a memory element of the wireless local area network.

6. The method of claim 1,
  wherein the downloading step comprises the step of sending a first time-stamp to the portable communication unit when downloading the information, and
  wherein the method further comprises the step of storing, in a memory element of the wireless local area network, a second time-stamp for each information type stored therein whenever the information corresponding to the information type is changed, and
  wherein the determining step comprises the step of comparing the first and second time-stamps to determine whether the information is out-of-date.

7. The method of claim 1, further comprising the steps of:
  entering, by the user of the portable communication unit, a command to modify the local information profile;
  transmitting the command to the wireless local area network;
  sending, in response to the command, from the wireless local area network to the portable communication unit, an electronic form listing the at least one of types of information and methods of delivering said information available for the location along with an indication of current selections; and
  selecting by the user, from the electronic form, among the at least one of types of information and methods of delivering said information, thereby updating the local information profile.

8. A portable communication unit for selectively providing information specific to a location, the information provided to the portable communication unit when the portable communication unit registers with a wireless local area network serving the location, the portable communication unit comprising:
  a transceiver for communicating with the wireless local area network;
  a processor coupled to the transceiver for controlling the portable communication unit;
  a memory coupled to the processor for storing software and other data; and
  a user interface coupled to the processor for conveying the information to a user,
  wherein the processor is programmed to cooperate with the wireless local area network to:
    perform a registration process between the portable communication unit and the wireless local area network when the portable communication unit moves within communication range of the wireless local area network;
    create a local information profile describing at least one of types of information and methods of delivering said information desired by the user;
    determine, during the registration process, whether a type of information described in the local information profile is out-of-date or missing in the portable communication unit; and
    download said type of information to the portable communication unit in accordance with the local information profile, only when said type of information is out-of-date or missing in the portable communication unit.

9. The portable communication unit of claim 8, wherein the processor is further programmed to:
  cooperate with the transceiver to receive a request from the wireless local area network to send the local information profile to the wireless local area network; and
  cooperate further with the transceiver to transmit the local information profile and a user identifier to the wireless local area network in response to the request.

10. The portable communication unit of claim 8, wherein the processor is further programmed to:
  cooperate with the wireless local area network to discover that neither the wireless local area network nor the portable communication unit has a copy of the local information profile for the user;
  cooperate with the transceiver to receive from the wireless local area network an electronic form listing the at least one of types of information and methods of delivering said information available for the location; and
  cooperate with the user interface to allow the user to select, from the electronic form, among the at least one of types of information and methods of delivering said information, thereby creating the local information profile.

11. The portable communication unit of claim 8, wherein the processor is further programmed to:
  cooperate with the wireless local area network to discover that the local information profile in the portable communication unit is indefinite about how certain types of information available from the wireless local area network are to be handled;
  cooperate with the transceiver to receive from the wireless local area network an electronic form listing the at least one of types of information and methods of delivering said information available for the location; and
  cooperate with the user interface to allow the user to select, from the electronic form, among the at least one of types of information and methods of delivering said information, thereby updating the local information profile.

12. The portable communication unit of claim 8, wherein the processor is further programmed to cooperate with the transceiver and the wireless local area network to store the local information profile and a user identifier in a memory element of the wireless local area network.

13. The portable communication unit of claim 8, wherein the processor is further programmed to:
   cooperate with the transceiver to receive a first time-stamp when downloading the information; and
   cooperate further with the transceiver to send the first time-stamp to the wireless local area network during the registration process.

14. The portable communication unit of claim 8, wherein the processor is further programmed to:
   cooperate with the user interface to allow the user to enter a command to modify the local information profile;
   cooperate with the transceiver to transmit the command to the wireless local area network;
   cooperate further with the transceiver to receive from the wireless local area network an electronic form listing the at least one of types of information and methods of delivering said information available for the location along with an indication of current selections; and
   cooperate with the user interface to allow the user to select, from the electronic form, among the at least one of types of information and methods of delivering said information, thereby updating the local information profile.

15. A wireless local area network for selectively providing information specific to a location, the information provided to a portable communication unit when the portable communication unit registers with the wireless local area network, the wireless local area network comprising:
   a transceiver for communicating with the portable communication unit;
   a processor coupled to the transceiver for controlling the transceiver;
   a memory element coupled to the processor for storing the information; and
   an input interface coupled to the processor for receiving the information, wherein the processor is programmed to:
   perform a registration process between the portable communication unit and the wireless local area network when the portable communication unit moves within communication range of the wireless local area network;
   cooperate with the portable communication unit to create a local information profile describing at least one of types of information and methods of delivering said information desired by a user of the portable communication unit;
   determine, during the registration process, whether a type of information described in the local information profile is out-of-date or missing in the portable communication unit; and
   download said type of information to the portable communication unit in accordance with the local information profile, only when said type of information is out-of-date or missing in the portable communication unit.

16. The wireless local area network of claim 15, wherein the processor is further programmed to:
   cooperate with the memory element to discover that the wireless local area network does not have a copy of the local information profile for the user;
   cooperate with the transceiver to request the portable communication unit to send the local information profile to the wireless local area network; and
   cooperate further with the transceiver to receive from the portable communication unit the local information profile and a user identifier.

17. The wireless local area network of claim 15, wherein the processor is further programmed to:
   cooperate with the memory element and the transceiver to discover that neither the wireless local area network nor the portable communication unit has a copy of the local information profile for the user; and
   cooperate further with the transceiver to send to the portable communication unit an electronic form listing the at least one of types of information and methods of delivering said information available for the location.

18. The wireless local area network of claim 15, wherein the processor is further programmed to:
   cooperate with the transceiver to discover that the local information profile in the portable communication unit is indefinite about how certain types of information available from the wireless local area network are to be handled; and
   cooperate further with the transceiver to send to the portable communication unit an electronic form listing the at least one of types of information and methods of delivering said information available for the location.

19. The wireless local area network of claim 15, wherein the processor is further programmed to
   store the local information profile and a user identifier in a memory element of the wireless local area network.

20. The wireless local area network of claim 15, wherein the processor is further programmed to:
   cooperate with the transceiver to send a first time-stamp to the portable communication unit when downloading the information;
   store in the memory element a second time-stamp for each information type stored therein whenever the information corresponding to the information type is changed; and
   compare the first and second time-stamps to determine whether said type of information is out-of-date.

21. The wireless local area network of claim 15, wherein the processor is further programmed to:
   cooperate with the transceiver to receive a command from the portable communication unit to modify the local information profile; and
   cooperate further with the transceiver to send, to the portable communication unit in response to the command, an electronic form listing the at least one of types of information and methods of delivering said information available for the location along with an indication of current selections.

* * * * *